Nov. 13, 1962

V. LUCHI 3,063,275

DEVICE FOR EVERTING TUBULAR FABRIC

Filed Feb. 10, 1959

INVENTOR
VINICIO LUCHI

Richardson, David and Nerdon

ATTYS.

Nov. 13, 1962
V. LUCHI
3,063,275
DEVICE FOR EVERTING TUBULAR FABRIC
Filed Feb. 10, 1959
6 Sheets-Sheet 2
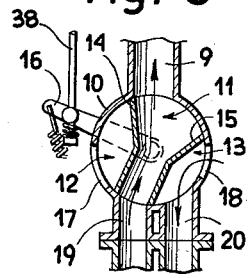
Fig. 4
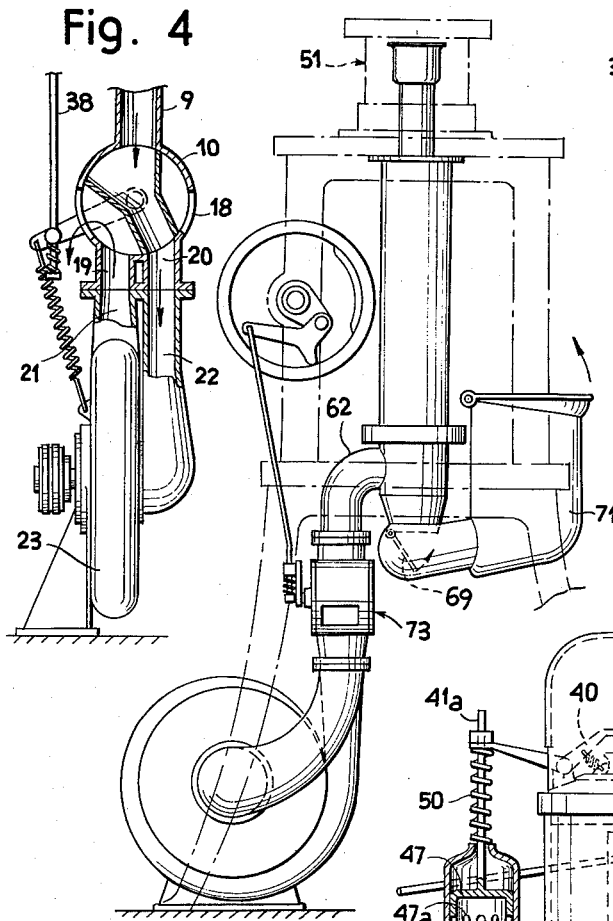
Fig. 5
Fig. 7
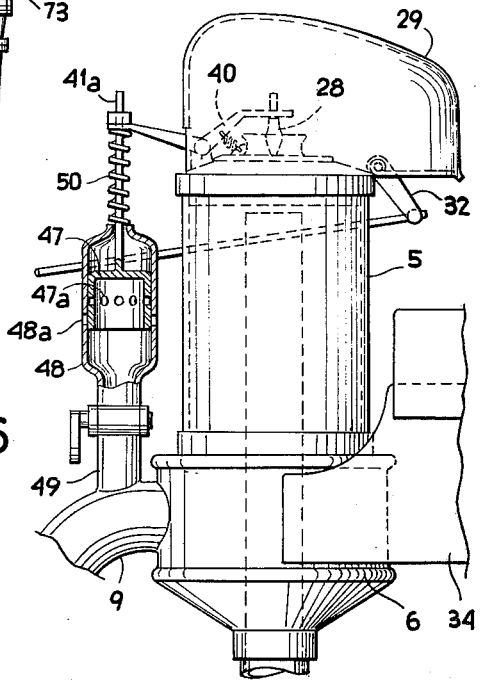
Fig. 6
INVENTOR:
VINICIO LUCHI
by
Richardson, David and Nardon
ATTYS.

Nov. 13, 1962 V. LUCHI 3,063,275
DEVICE FOR EVERTING TUBULAR FABRIC
Filed Feb. 10, 1959 6 Sheets-Sheet 3
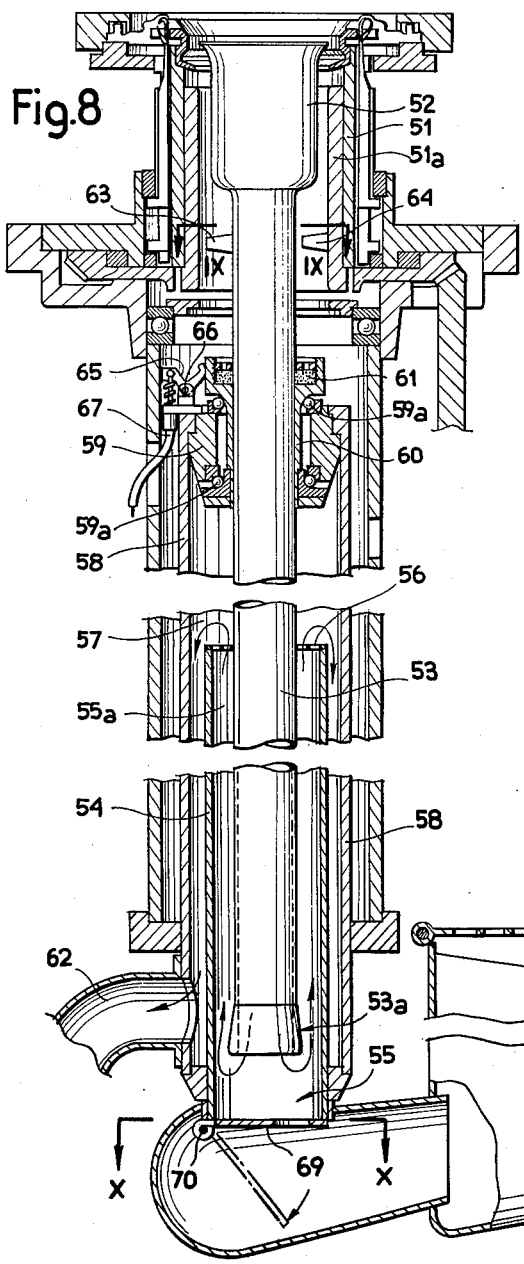
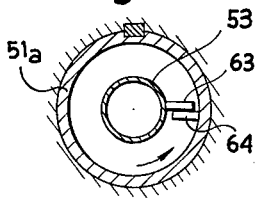
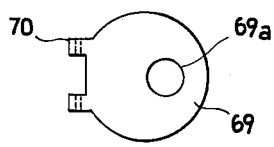
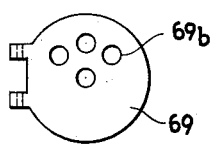
INVENTOR:
VINICIO LUCHI Nov. 13, 1962

V. LUCHI 3,063,275

DEVICE FOR EVERTING TUBULAR FABRIC

Filed Feb. 10, 1959

INVENTOR:
VINICIO LUCHI
By
Richardson, David and Nordon
ATTYS.

Nov. 13, 1962 V. LUCHI 3,063,275
DEVICE FOR EVERTING TUBULAR FABRIC
Filed Feb. 10, 1959 6 Sheets-Sheet 5

INVENTOR:
VINICIO LUCHI
By
Richardson, David and Nardon
ATTYS.

Nov. 13, 1962 V. LUCHI 3,063,275
DEVICE FOR EVERTING TUBULAR FABRIC
Filed Feb. 10, 1959 6 Sheets-Sheet 6

INVENTOR:
VINICIO LUCHI
By Richardson, David and Nordon
ATTYS.

United States Patent Office 3,063,275
Patented Nov. 13, 1962

1

3,063,275
DEVICE FOR EVERTING TUBULAR FABRIC
Vinicio Luchi, Via La Villa, Galceti, Prato,
Florence, Italy
Filed Feb. 10, 1959, Ser. No. 792,359
7 Claims. (Cl. 66—149)

The invention relates to a pneumatic device for the everting of tubular fabric formed by circular stocking machines and the like, which may be independent or associated with said machines.

The device, according to the invention, includes at the end of a conduit, wherein an airstream is set up, an eversion chamber at least partly surrounding said conduit. In the chamber an airstream is set up and is radially extended in the centrifugal direction with respect to the mouth end of the conduit, to be directed, in said chamber, parallelly and externally to said conduit. The arrangement is such that when the fabric reaches the end of the conduit the leading edge of the fabric is stressed by the radial stream and opened, to cause everting of the fabric around the conduit.

The radial centrifugal stream is practically obtained either by the conveying stream, or by a second airstream which passes through an opening substantially opposed to the end mouth of the pneumatic conduit into the eversion chamber radially in the centrifugal direction adjacent the open end of the conduit. The tubular fabric emerges from the conduit and is conveyed into the eversion chamber longitudinally of and around the conduit.

In a device according to the invention, a suction is formed through a grid in the eversion chamber at a distance from the end of the conduit. The suction produces the stream in the conduit for conveying the fabric and the radial transversal stream which passes from the exterior of the device through openings formed in the wall of the eversion chamber.

In order to effect the ejection of everted fabric, means are arranged to reverse the direction of the airstream in the eversion chamber in such a direction as to form an airstream in said chamber, in a direction opposite to that which has produced the eversion. The fabric is finally ejected from a passage located near the end of the conduit. This passage may be formed by a conveying conduit for the fabric. It may also be provided so that the wall of the eversion chamber, which is located in front of the conduit opening, may be made movable and be opened to allow the ejection of the fabric from the passage.

The accompanying drawings illustrate diagrammatically some embodiments of the invention.

FIG. 4 illustrates a partly sectioned view taken along the line IV—IV of FIG. 1.

FIG. 5 shows a part of FIG. 4 with the airstream control members in a different position from that shown in FIG. 4.

FIG. 6 is similar to a part of FIG. 1 on an enlarged scale, with parts in cross-section illustrating a modification of the invention.

FIG. 7 is a side elevational view of a second modification of the invention showing in dotted lines an associated needle cylinder.

FIG. 8 illustrates a vertical diametral section on an enlarged scale of part of the apparatus of FIG. 7 shown associated with a needle cylinder.

FIG. 9 is a section taken along the line IX—IX of FIG. 8.

FIG. 10 is a top view taken along line X—X of FIG. 8 showing a discharge door.

FIG. 11 is a top view of another discharge door.

Figure 1:
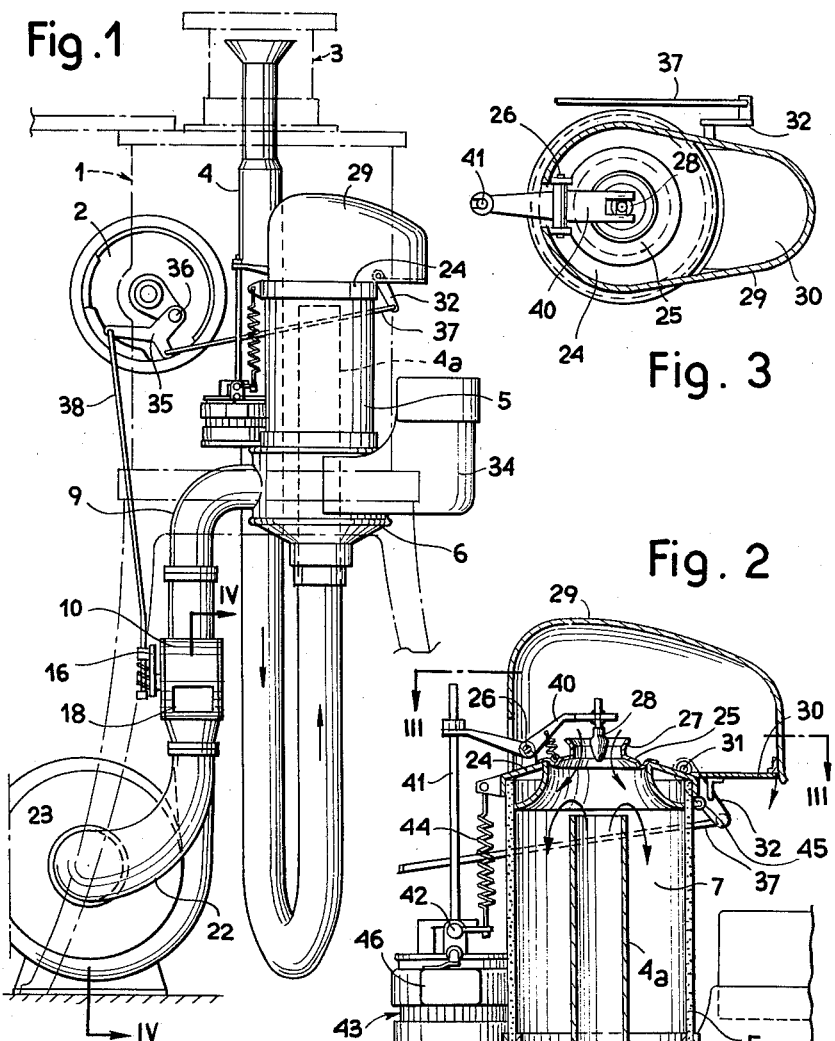
FIG. 1 illustrates diagrammatically a side view of a first apparatus according ot an embodiment of the invention, combined with a circular knitting machine for stockings.
Figure 3:
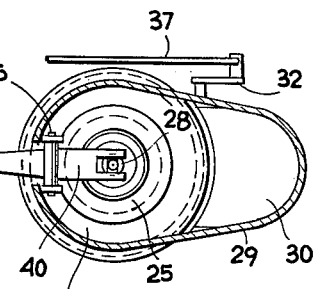
FIG. 3 is a section taken along the line III—III of FIG. 2.

According to FIGS. 1 to 5, numeral 1 generically indicates the contour of the knitting machine and 2 denotes the main cam drum, which effects one revolution for each forming of a stocking or any other fabric. Numeral 3 generically denotes the contour of the needle cylinder, to which a conduit 4 is coaxially arranged, and where pneumatic tensioning of the fabric is determined. The conduit 4 is cylindrical and is provided with an end portion 4a, upwardly turned and open. The end portion 4a is extended in the eversion chamber, defined by a cylindrical or similar shaped casing 5, which is mounted on a structure forming a collector 6 which is separated from the eversion chamber 7 by means of a grid 8. The collector 6 is joined to a conduit or line 9 and communicates with the chamber 7 via grid 8 to effect suction of the fabric in the conduit 4. Line 9 comes out (see FIGS. 4 and 5) at a cylindrical box 10 which serves as a deflector. The box is provided with an inner rotor which defines three passages, respectively central 11 and lateral, 12 and 13, by means of two walls 14 and 15; see FIG. 5. The distributor rotor is externally controlled through a lever 16. The box 10 is provided with two wide windows 17 and 18 (see FIG. 5) and two adjacent unions 19 and 20. The latter, through a common flange, are coupled to blast conduit 21 and to suction conduit 22 respectively, located adjacent to a suction-compression unit 23. By this arrangement, and by locating the valve 14, 15 in the position shown in FIG. 4, the suction is produced in line 9 and thus in the conduit 4, through the eversion chamber 7. By moving the valve to the position of FIG. 5 by means of the lever 16 an air blast is produced in line 9 and then in the cavity of the eversion chamber 7. In the first setting of the valve, there is a blast of air through the window 17 outwardly, while in the second setting of the valve, there is a suction exerted through the window 18. In an intermediate position the valve can cut off the airstream in conduit 4.

Above the cylindrical casing 5 in which the eversion chamber 7 is positioned an annular covering element 24 which forms a shaped union between casing 5 and a central opening thereof, thus reducing the annular section of the stream between the orifice of the conduit 4, 4a and the shaped inner wall of the element 24. The central opening of the element 24 is partly closed by a plate 25 on the element 24 and forming a ferrule 27 which defines an opening coaxial to the geometric axis of the end portion 4a of the conveying conduit 4 for the fabric. In the central portion of the passage formed by the ferrule 27, there is provided an aerodynamically shaped element 28 directed towards the eversion chamber 7 in such a way as to make the passage annular between element 28 and the ferrule 27. The unit 25, 27, 28 linked to a hinge 26 on element 24 is relatively very light and may be raised by a thrust of the air when the deflecting valve 14, 15 is positioned as shown in FIG. 5. Above the described unit, there is provided a hood 29 which projects on one side to form an opening which is closed by a valve 30 hinged at 31 and actuated by a lever 32.

When the valve 30 is closed and with the suction in the conduit 4, 4a through the line 9 (arrangement of the deflection valve 14, 15 as illustrated in FIG. 4), there is a high suction stream for the tensioning of the fabric. When the valve 30 is more or less opened, a suction is produced through the annular passage between the elements 27 and 28. The strength of the airstream decreases in the condiut 4, 4a. The airstream is radially deflected in the centrifugal direction by the annular passage between elements 27 and 28. This airstream, entering from the conduit 4a into the everting chamber 7, effects the everting of the stocking tubular fabric, when the latter is conveyed by the relatively reduced conveying stream in the conduit 4a. The everted stocking is collected in the everting chamber 7, surrounding the end portion 4a of the conduit 4. In order to eject the everted fabric, the complete opening of the valve 30 and thus the displacement of the deflection valve from the position of FIG. 4 to the position of FIG. 5 is effected. A stream of blast air from the conduit 9 passes through grid 8 and effects the raising of the unit 25, 27, 28 around the hinge 26 (owing to the light weight of this unit) and the ejection of the everted fabric from the opening defined by the annular union 24 in the cavity of the cap 29 and therefrom through the opening controlled by the opened valve 30, to a collecting basket 34, carried by the collector 6.

In order to actuate the valve 30 and the valve 14, 15 contained in the cylindrical case 10, in the desired manner, there is provided a lever member 35 (see FIG. 1), having several arms, and linked at 36 to a stationary pin. The lever member 35 cooperates with a profile of an inner cam of the drum 2, in such a way as to determine through a tie rod 37, the initial and adjustable opening of the valve 30 and subsequently the control of the valve contained in the casing 10 through the lever 16 and a tie rod 38.

In operation of the device, the airstream in the conduit 4, 4a is constant during the draft and is constant but attenuated during the everting of the stocking as air passes through the valve 30 and through the annular passage defined by the members 27 and 28.

Figure 2:
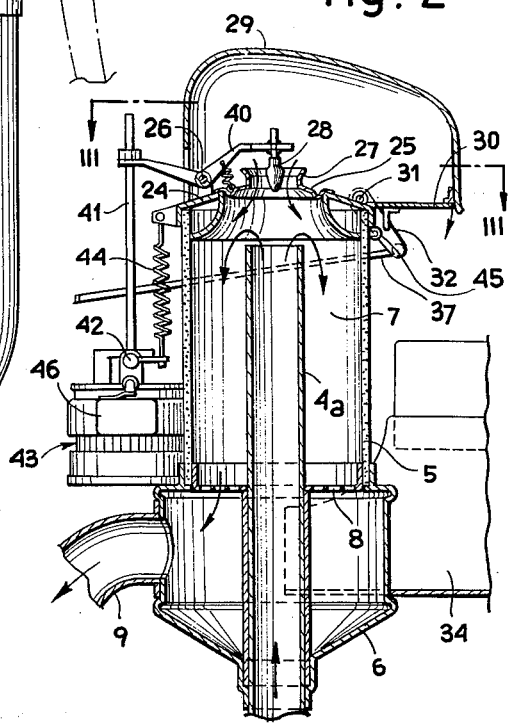
FIG. 2 illustrates an enlarged vertical section of part of the apparatus of FIG. 1 showing an eversion chamber and members combined therewith.

There may be provided a pulsing airstream in the conduit 4, 4a, when the tubular fabric of the stocking is conveyed for the everting in such a way as to produce a cyclical slow-down or stoppage of the fabric during the everting step. This pulsing airstream may be obtained by locating a valve (not shown) in the line 9, in such a way that the line 9 during the everting step, is periodically closed or at least throttled. Alternatively as shown in FIG. 2, there may be provided means to make the stream pulsing in the conduit 4, 4a by determining a variation of flow through the annular passage between 27 and 28. This may be done by cyclically moving the opening of the valve 30 or by cyclically moving the element 28 in the axial direction in order to vary the section of passage between 27 and 28. According to FIG. 2, the member 28 may be supported by a lever member 40 linked at 26 to the structure 24. The lever 40 may be moved by a tie rod 41 connected to the head 42 of an anchor or core of an electromagnet generically indicated by 43, which is laterally fixed to the assembly of the members 6, 5, 24. The electromagnet is cyclically energized to lower core 42 and tie rod 41 so as to raise the element 28. A spring 44 tends to raise the core and to lower the element 28. The core is moved between two limit stops. A push-button type switch 45 may be mounted on casing 5 and connected in circuit with electromagnet 43. The button of switch 45 will be actuated by valve 30 or by lever 32 to operate electromagnet 43 in the everting step of operation. A second switch 46 may be combined with the core to de-energize the electromagnet in a cyclical manner at the end of the lowering of the core 42.

According to a first modification as shown in FIG. 6, the member 28 is moved by a pneumatic system, instead of an electromagnetic one. In this case, a tie rod 41a equivalent to that denoted by 41 acts on the lever 40 and is connected to a hollow piston 47 sliding in a cylinder 48, communicating through conduit 49 with line 9. The piston 47 is provided with holes 47a and cylinder 48 with holes 48a. The reduction in pressure in the line 9, when the conduit 49 is opened, determines the lowering of the piston 47 against the action of opposing spring 50, until the pressure in the cylinder 48 is raised owing to the superimposition of the holes 47a with the holes 48a. Under these conditions spring 50 moves the piston 47 up until pressure in cylinder 48 drops again to cause the piston to move downwardly. In this way it is possible by a variation in pressure in line 9 to cause a pulsing airstream in the conduit 4a.

In a second modification according to FIGS. 7 to 11, numeral 51 denotes the needle cylinder. The sleeve member 51a, provided with a bevel driving toothed rim, is located in the interior of the needle cylinder and is rotatably coupled therewith. In the interior of the member 51a is a tensioning conduit in the form of a funnel 52 having a tubular portion 53 coaxial to the needle cylinder. The conduit 53 is limited in longitudinal extent and ends with a lower rounded and enlarged mouth 53a near the lower end of a casing 54. Casing 54 surrounds the lower section of conduit 53 and forms an everting chamber 55 extending upwardly with a portion 55a of annular section surrounding the conduit 53. Communication is established through upper grid openings 56 of the casing 54 between the chamber 55 and a collector 57 formed by a stationary casing 58. Casing 58 carries a support 59 provided with bearings 59a designed to support a ferrule 60 which is thus capable of rotating. The conduit 53 is supported rotatably on sleeve 59 by a resilient collar 62 which clamps the ferrule 60 to conduit 53. A conduit 62 for the air under suction extends from the collector 57. The rotary engagement of conduit 53 is obtained either by the entraining action of the rotating stocking on the conduit 53, or through a projecting pin 63 which is designed to cooperate with a stop 64 (see FIG. 9) integral with the rotary member 51a in the interior of the needle cylinder. Through axial relative movement of the members 51a and 52, 53, pin 63 is disengaged from stop 64 so that it is possible to effect or interrupt the rotation of the conduit 52, 53 by the needle cylinder. The stopping of the rotation corresponds to the initial formation of the welts of the stocking. In order to effect the stoppage and to prevent the rotation of the conduit 53 and thus of the funnel 52 when the fabric welts are to be formed, the rotary assembly 52, 53, 60 may be submitted to the action of a braking device controlled by a member of the machine, for instance, by the rear drum of the cams, such as that denoted by 2 in FIG. 1. In FIG. 8, the brake is formed by a square lever 65 linked at 66 to the assembly 58, 59. The lever may be moved in one direction by a spring and in the opposite direction by a flexible sheathed cable 67, in such a way as to obtain a friction action on the cylindrical outside of the ferrule 60 and the raising of the lever.

The tensioning of the fabric in the conduit 53 and the everting of the tubular fabric in the space 55a of the chamber 55, is produced during the forming of the stocking by suction from conduit 62. In the chamber 55 and in the space 55a, there is produced a pneumatic return action both for the everting and for the tensioning.

The chamber 55 is closed by a door 69 hinged laterally at 70 and formed as shown in FIG. 10 with a single hole 69a or according to FIG. 11, with several holes 69b. In both cases, an eccentric stream is obtained by effect of the suction obtained through the conduit 62. The stream through the passages 69a or 69b aids the initial everting of the lower welt of stocking fabric being formed. The fabric is everted progressively during its forming in the chamber 55a. When the fabric is detached from the needles, which have formed it, the everting is completed by effect of an airstream which may be more attenuated in relation to that obtained during the manufacture, for the tensioning. The attenuation of the stream may be obtained by a partial opening of the door 69.

Through the production, after the completion of the forming of the stocking fabric, of a blast of air in the conduit 62, a pneumatic thrust is obtained, for the ejection of the finished fabric which is everted in chamber 55a. The ejection occurs downwardly through the lower mouth of the chamber 55, which is normally closed by the door 69. This door is openable, for the ejection, either in a spontaneous manner owing to the thrust of the air, or in a manner controlled by the machine working schedule. The stocking fabric is collected in a tank 71 or is conveyed to another operational station.

The air control in the conduit 62 may be determined by a valve 73 (see FIG. 7) similar to that illustrated in FIGS. 4 and 5, actuated as already described.

According to another variation not illustrated, the outer casing 54 forming the chamber 55, 55a may be rotary. The casing may then be integral with the conduit 53 and being provided with means to assure a pneumatic seal between the stationary and rotary parts. The door 69 could be provided with a central hole, having a slight eccentricity.

Figure 12:
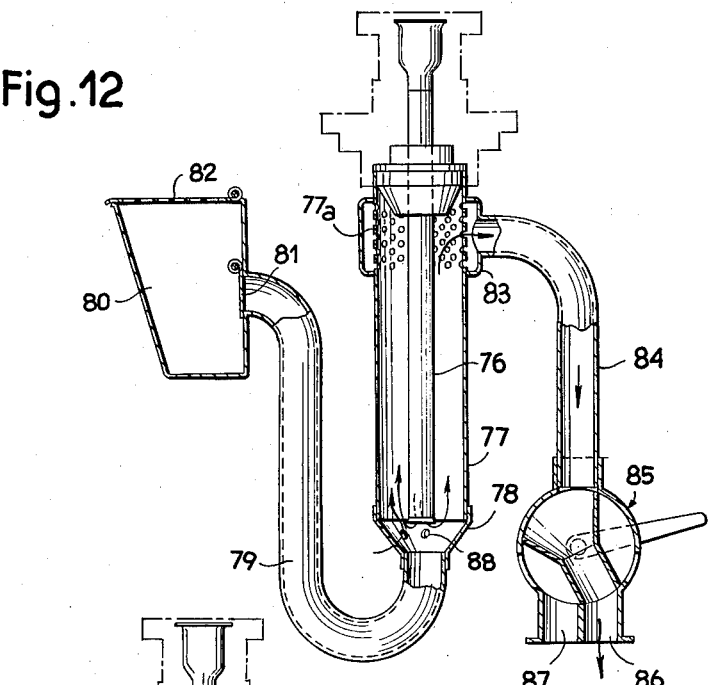
FIGS. 12 and 13 are vertical sectional views of a third modification similar to that shown in FIG. 8, showing two different operational arrangements.
Figure 13:
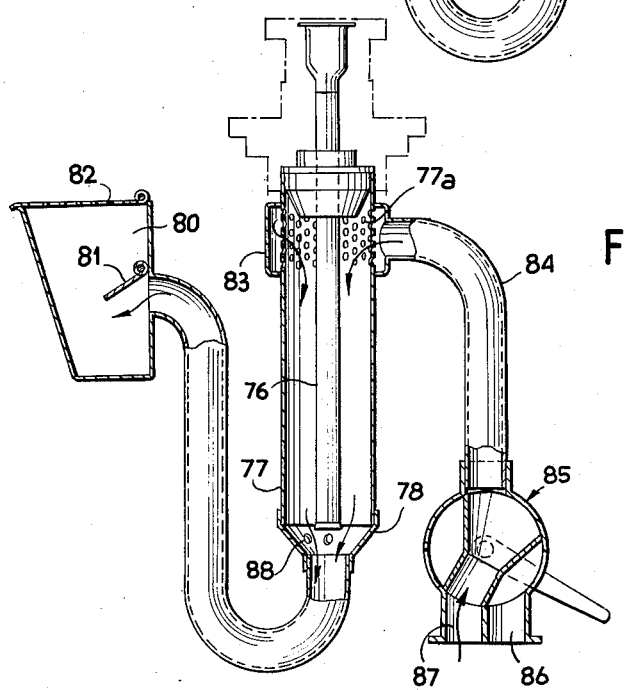

The arrangement of FIGS. 12 and 13 shows a third modification of the invention. The pulling or traction conduit 76 (similar to the one denoted by 53) leads into an eversion chamber outwardly defined by a tubular casing 77 joined by means of a frusto-conical element 78 to a conduit 79 which leads into a chamber 80 for the collection of the fabric. A plate valve 81 is arranged at the end of the conduit 79 to be opened towards the chamber 80. Chamber 80 is closed by a grid door 82. In the upper section of the cylindrical casing 77 there is arranged a portion of the grid wall 77a, with which a collector 83 communicates. The collector surrounds the casing 77 and leads to a conduit 84 extending from valve 85. This valve places the conduit 84 in communication with a suction source, indicated by the fitting section 86, or with a blast air source, indicated by fitting section 87. The valve 85 is similar to that previously described. In the arrangement illustrated in FIG. 12, conduit 84 is connected to the suction source. The blast and eversion of the tubular stocking fabric are produced around the rotary conduit 76. The conduit 79, owing to the low pressure in the eversion chamber, is closed by the valve 81. Entry of air may be obtained through the holes 88 in the conical wall 78 joining the casing 77 and the conduit 79, to facilitate the eversion of the stocking, as previously described. After having completed the eversion of the stocking, which is collected around the rotary conduit 76, the valve 85 is moved in such a way as to obtain a blast in the conduit 84 through the grids 77a, arrangement of FIG. 13). The fabric is thus pushed by the airstream through the union 78 and the conduit 79 into the chamber 80. The valve 81 is opened by the air blast. The air comes out from the grid forming the cover 82 designed to retain the fabric.

Figure 14:
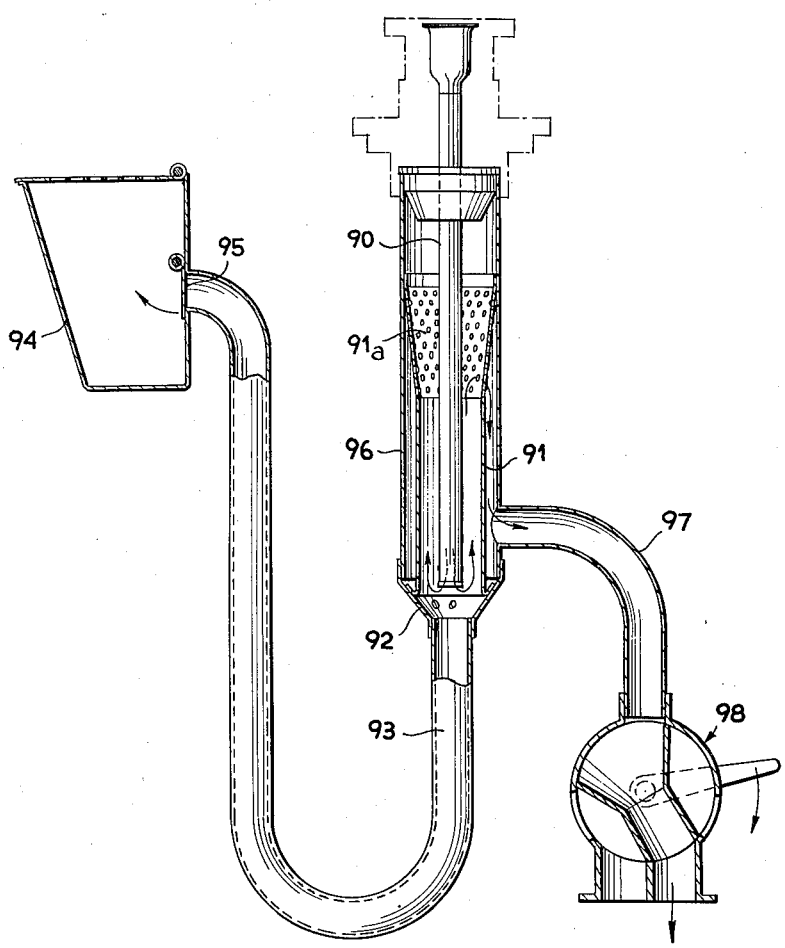
FIG. 14 is a sectional view partially in elevation of a fourth modification of the invention.

According to a fourth modification shown in FIG. 14, the draft conduit 90 leads into a chamber defined by a casing 91 and joining, through the frusto-conical element 92 the conduit 93 (similar to that denoted by 79) which leads into a chamber 94 through a plate valve 95. The wall 91 is joined by a frusto-conical grid portion 91a to a surrounding cylindrical wall 96, which defines a collector, to whose lower end the conduit 97, extending from the valve 98 similar to the one denoted by 85 is joined. In this embodiment after the suction which determines the tensioning and everting of the fabric, there is the pneumatic conveying of the everted fabric through conduit 93 and valve 95 to chamber 94.

Figure 15:
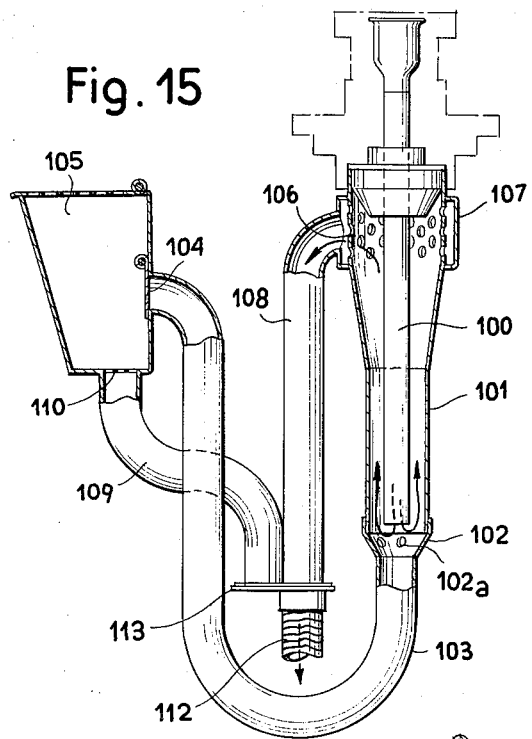
FIGS. 15 and 16 are vertical sectional views partially in elevation of a fifth modification shown in two operational arrangements.
Figure 16:
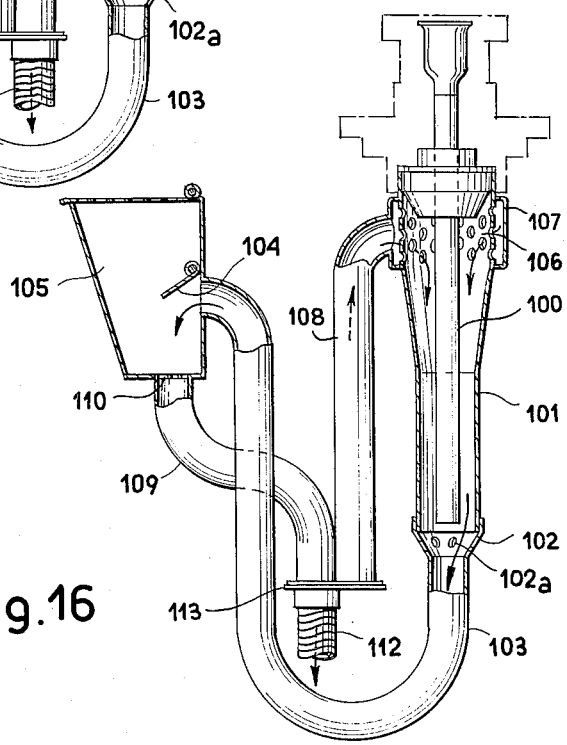

According to a fifth modification shown in FIGS. 15 and 16, the rotary draft conduit 100 leads into the lower section of the eversion chamber outwardly defined by the wall 101, which is joined through the frusto-conical portion or element 102 to the conduit 103, leading through the valve 104 into the stopping chamber 105. In the upper section of casing 101 of the everting chamber, there is formed a grid 106, with which a collector 107 communicates. The collector is joined to a conduit 108. A conduit 109 extends from a grid 110 located on the bottom of the chamber 105 and is located on the side of the conduit 108 where there is a valve which allows a suction conduit 112 alternatively to communicate with conduit 108 or with conduit 109, the other conduit being advantageously put in communication with the atmosphere. The valve 113 may be a flat plate which moves flexible conduit 112. Holes 102a are cut in the union 102 to obtain an eccentric stream during the everting step, as previously described. In the arrangement of FIG. 15, for the draft and everting, the low air pressure obtained through the conduit 112 produces a suction stream in the conduit 100, in addition to a radial everting stream in the chamber defined by the casing 101 so that the fabric is everted and is arranged around the conduit 100. In this arrangement, the conduit 103 is closed by the valve 104. In the ejection arrangement of the everted fabric, located around the conduit 100 (arrangement of FIG. 16), the conduit 112 is put in communication with the conduit 109, which produces a conveying stream in the direction of the arrows from the everting chamber through the conduit 103, the chamber 105 and the conduit 109, so that the fabric passes through the conduit 103 and is discharged into the chamber 105, being retained by the grid 110. In this case, the operation of the apparatus is obtained through a suction source and without any need of air blast.

It is to be intended that the drawings only show a limited number of embodiments, given only as a practical demonstration of the invention. The invention may be varied in the forms and arrangements described without however departing from the scope of the invention as defined by the appended claims.

What I claim is:

1. A device for everting tubular fabric fed rotatably from a knitting machine or the like, comprising a substantially cylindrical casing, a conduit supported in the casing and coaxial therewith, said conduit having one open end extending axially beyond one end of the casing for receiving the tubular fabric therein, said conduit having an open other end for discharging the tubular fabric therefrom, said open other end of the conduit being located near the other end of the casing, said casing being provided with grid means having plural openings, said grid means being spaced from said other end of the conduit, air suction and blowing means communicating with said casing and the open other end of the conduit through said openings in the grid means, there being an eversion chamber for the tubular fabric discharged from the conduit defined between said conduit and casing, and pneumatic conveying means connected to the open other end of the casing to receive everted tubular fabric from said chamber.

2. A device according to claim 1, wherein said casing is provided with holes in its side thereof near said other end thereof to permit entry of air into said chamber around said other end of the conduit, said one end of the conduit being enlarged to facilitate entry of the tubular fabric therein.

3. A device according to claim 1 further comprising a hinged apertured door at said other end of the casing opening into said conveying means.

4. A device according to claim 1, wherein said pneumatic conveying means is connected to the other end of the casing by a conical wall having holes in a side thereof for admitting an airstream.

5. A device according to claim 1, wherein said pneumatic conveying means terminates in another chamber for collecting the everted tubular fabric, said other chamber having a door normally closed to maintain suction in the eversion chamber.

6. A device for everting tubular fabric fed from a knitting machine or the like, comprising a substantially cylindrical casing, a conduit supported coaxially in the casing, said conduit having one open end extending axially beyond one end of the casing for receiving the tubular fabric therein, said conduit having an open other end for discharging tubular fabric therefrom, said open other end of the conduit being located near the other end of the casing, said casing being provided with grid means having plural openings, said grid means being spaced from said other end of the conduit, air suction and blowing means communicating with said casing and open other end of the conduit through said openings in the grid means, there being an eversion chamber for the tubular fabric discharged from the conduit defined between said conduit and casing, conveying means connected to the open other end of the casing to receive everted tubular fabric from said chamber, and collecting means connected to said conveying means for storing everted tubular fabric conveyed thereto via said conveying means.

7. A device according to claim 6 wherein said suction means is connected to said collecting means, and valve means for selectively establishing a suction in said chamber and said collecting means.

References Cited in the file of this patent

UNITED STATES PATENTS 2,873,596  Larkin _____ Feb. 17, 1959

FOREIGN PATENTS 202,394  Australia _____ July 5, 1956
1,183,041  France _____ Jan. 26, 1959